US009858259B2

(12) United States Patent
Pottier et al.

(10) Patent No.: US 9,858,259 B2
(45) Date of Patent: *Jan. 2, 2018

(54) AUTOMATIC CAPTURE OF INFORMATION FROM AUDIO DATA AND COMPUTER OPERATING CONTEXT

(71) Applicant: Microsoft Technology Licensing, LLC, Redmond, WA (US)

(72) Inventors: Marc Pottier, Aix en Provence (FR); Colleen Hamilton, Kirkland, WA (US); Eddie Fusaro, Sammamish, WA (US); Lee Dicks Clark, Seattle, WA (US); Daniel Escapa, Seattle, WA (US); Elizabeth Scoble, Seattle, WA (US); Allison Gallant, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,298

(22) Filed: May 31, 2017

(65) Prior Publication Data
US 2017/0262428 A1 Sep. 14, 2017

Related U.S. Application Data

(63) Continuation of application No. 14/634,841, filed on Mar. 1, 2015, now Pat. No. 9,703,771.

(51) Int. Cl.
*G06F 17/27* (2006.01)
*G10L 15/26* (2006.01)
(Continued)

(52) U.S. Cl.
CPC ...... *G06F 17/2765* (2013.01); *G06F 17/2705* (2013.01); *G06F 17/2785* (2013.01);
(Continued)

(58) Field of Classification Search
USPC ............ 704/1–10, 200, 235–251, 257–270.1
See application file for complete search history.

(56) References Cited

U.S. PATENT DOCUMENTS

| 7,647,555 B1 | 1/2010 | Wilcox et al. |
| 7,907,705 B1 | 3/2011 | Huff et al. |
| (Continued) | | |

OTHER PUBLICATIONS

"International Preliminary Report on Patentability Issued in PCT Application No. PCT/US2016/017047", dated May 9, 2017, 6 Pages.
(Continued)

*Primary Examiner* — Marcellus Augustin
(74) *Attorney, Agent, or Firm* — Patent GC LLC

(57) ABSTRACT

A computer system provides an automated tool that processes audio data and data about computer operating context to automatically capture information, such as information from conversations and meetings. The computer operating context can include, for example, environmental data sensed, or other contextual information maintained or tracked, by the computer. The audio data and computer operating context are processed by the computer to detect starting conditions for data extraction. After detecting a starting condition, the processor initiates speech processing on the audio information to generate corresponding text data. The processor processes the text data using text filters that define salient patterns in the text data. Such salient patterns can correspond to, for example, tasks to be performed, follow-up appointments and other events, messages to be sent, important points or notes, and the like. Such automatic processing improves user productivity in tracking valuable information from meetings and other conversations.

20 Claims, 6 Drawing Sheets

(51) Int. Cl.
G10L 15/22 (2006.01)
G10L 15/18 (2013.01)
G06Q 10/10 (2012.01)

(52) U.S. Cl.
CPC .............. *G06Q 10/10* (2013.01); *G10L 15/18* (2013.01); *G10L 15/1822* (2013.01); *G10L 15/22* (2013.01); *G10L 15/26* (2013.01); *G10L 2015/228* (2013.01)

(56) References Cited

U.S. PATENT DOCUMENTS

| | | | |
|---|---|---|---|
| 2003/0076352 | A1 | 4/2003 | Uhlig et al. |
| 2008/0301176 | A1 | 12/2008 | Fanelli et al. |
| 2009/0119246 | A1 | 5/2009 | Kansal |
| 2009/0198495 | A1* | 8/2009 | Hata ................ G10L 15/04 704/246 |
| 2011/0099006 | A1 | 4/2011 | Sundararaman et al. |
| 2011/0153744 | A1 | 6/2011 | Brown |
| 2012/0123779 | A1 | 5/2012 | Pratt et al. |
| 2012/0265528 | A1 | 10/2012 | Gruber et al. |
| 2014/0091139 | A1 | 4/2014 | Brown et al. |
| 2015/0019227 | A1* | 1/2015 | Anandarajah ........... G10L 15/22 704/257 |

OTHER PUBLICATIONS

"Automatic Follow Up for REAL TOR.com® Leads", Retrieved From: <<http://www.topproducer.com/campus/market-snapshot/capture-leads/ms-auto-fulfillment/>>, Jul. 26, 2012, 2 Pages.

"Cogi-Create Accurate Meeting Minutes by Capturing the Details", Retrieved From: <<http://www.cogi.com/create-accurate-meeting-minutes>>, Dec. 13, 2009, 5 Pages.

"Cogi's Online Transcription Services will Automate Note Taking on your Meetings and Calls", Retrieved From: <<http://www.cogi.com/online-transcription-services-and-note-taking-software>>, Dec. 13, 2009, 5 Pages.

"Evernote on the App Store on iTunes", Retrieved From: <<https://web.archive.org/web/20170201005523/https://itunes.apple.com/in/app/evernote/id281796108?mt=8>>, Mar. 8, 2012, 2 Pages.

"MetaMoJi Note", Retrieved From: <<http://noteanytime.com/en/>>, May 22, 2013, 5 Pages.

"Final Office Action Issued in U.S. Appl. No. 14/634,841", dated Nov. 21, 2016, 8 Pages.

"Non-Final Office Action Issued in U.S. Appl. No. 14/634,841", dated May 17, 2016, 26 Pages.

"Notice of Allowance Issued in U.S. Appl. No. 14/634,841", dated Mar. 28, 2017, 6 Pages.

"Notice of Allowance Issued in U.S. Appl. No. 14/634,841", dated Mar. 3, 2017, 10 Pages.

Dey, et al., "The Conference Assistant: Combining Context-Awareness with Wearable Computing", In Proceedings of the 3rd International Symposium on Wearable Computers, Digest of Papers, Oct. 18, 1999, 9 Pages.

Estes, David, "Sound Note on the App Store on iTunes", Retrieved From: <<https://itunes.apple.com/AU/app/id364789577?mt=8>>, Retrieved Date: Sep. 26, 2014, 2 Pages.

Jones, et al., "People-To-People-to-Geographical-Places: The P3 Framework for Location-Based Community Systems", In Proceedings of the Computer Supported Cooperative Work: The Journal of Collaborative Computing, Aug. 1, 2004, 26 Pages.

"AudioNote—Notepad and Voice Recorder", Retrieved From: <<https://itunes.apple.com/AU/app/id369820957?mt=8>>, Retrieved Date: Sep. 26, 2014, 2 Pages.

"International Search Report and Written Opinion Issued in PCT Application No. PCT/US2016/017047", dated May 23, 2016, 10 Pages.

"Second Written Opinion Issued in PCT Application No. PCT/US2016/017047", dated Feb. 10, 2017, 5 Pages.

\* cited by examiner

Operating Context Data 300
    Data extraction enabled 301
    Notetaking App in use 302
    Location 304
    Ambient light level 306
    Voice data 308
    User location history 310
    Next appointment date/time 312
    Next appointment location 314
    Active phone call 316

Rule set 350
    Rule 1 - 352
        Condition 1 - 354
            Values 358
            Operations 360
        Condition N – 354
            . . .
    Rule N – 352
        . . .

FIG.3

```
Pattern Data 400
      Pattern 1 - 402
            Text elements - 404
            Actions – 406
                  . . .
      Pattern N – 402
            Text elements - 404
            Actions – 406
```

FIG.4

AUTOMATIC CAPTURE OF INFORMATION FROM AUDIO DATA AND COMPUTER OPERATING CONTEXT

CROSS-REFERENCE TO RELATED APPLICATIONS

This application claims priority to, and the benefits of, under 35 U.S.C. §120, and is a continuation of, U.S. patent application Ser. No. 14/634,841, entitled "AUTOMATIC CAPTURE OF INFORMATION FROM AUDIO DATA AND COMPUTER OPERATING CONTEXT", filed Mar. 1, 2015, pending, which is hereby incorporated by reference.

BACKGROUND

Actively listening to a conversation, such as during a meeting, while simultaneously taking notes is a difficult skill which takes years for most people to learn how to do well. Without well-developed note taking skills, people typically recognize what appear to be important moments in a conversation, and then jot down brief, cryptic notes. Such notes often do not make sense out of context at a later time. Other important moments also can be missed. At another extreme, conversations can be recorded and transcribed. However, it can be tedious to search through a transcription of a conversation to identify important information. Data storage requirements for such recordings and transcriptions also can be prohibitive for daily use in business.

SUMMARY

This Summary is provided to introduce a selection of concepts in a simplified form that are further described below in the Detailed Description. This Summary is intended neither to identify key or essential features, nor to limit the scope, of the claimed subject matter.

A computer system provides an automated tool that processes audio data and data about computer operating context to automatically capture information, such as information from conversations and meetings. The computer operating context can include, for example, environmental data sensed, or other contextual information maintained or tracked, by the computer. The audio data and computer operating context are processed by the computer to detect starting conditions for data extraction. After detecting a starting condition, the processor initiates speech processing on the audio information to generate corresponding text data. The processor processes the text data using text filters that define salient patterns in the text data. Such salient patterns can correspond to, for example, tasks to be performed, follow-up appointments and other events, messages to be sent, important points or notes, and the like. Such automatic processing improves user productivity in tracking valuable information from meetings and other conversations.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is a diagram of example data structures for, and rule structures that can define, starting conditions.

FIG. 4 is a flow chart describing operation of an example implementation of an activity detection module.

DETAILED DESCRIPTION

Figure 1:
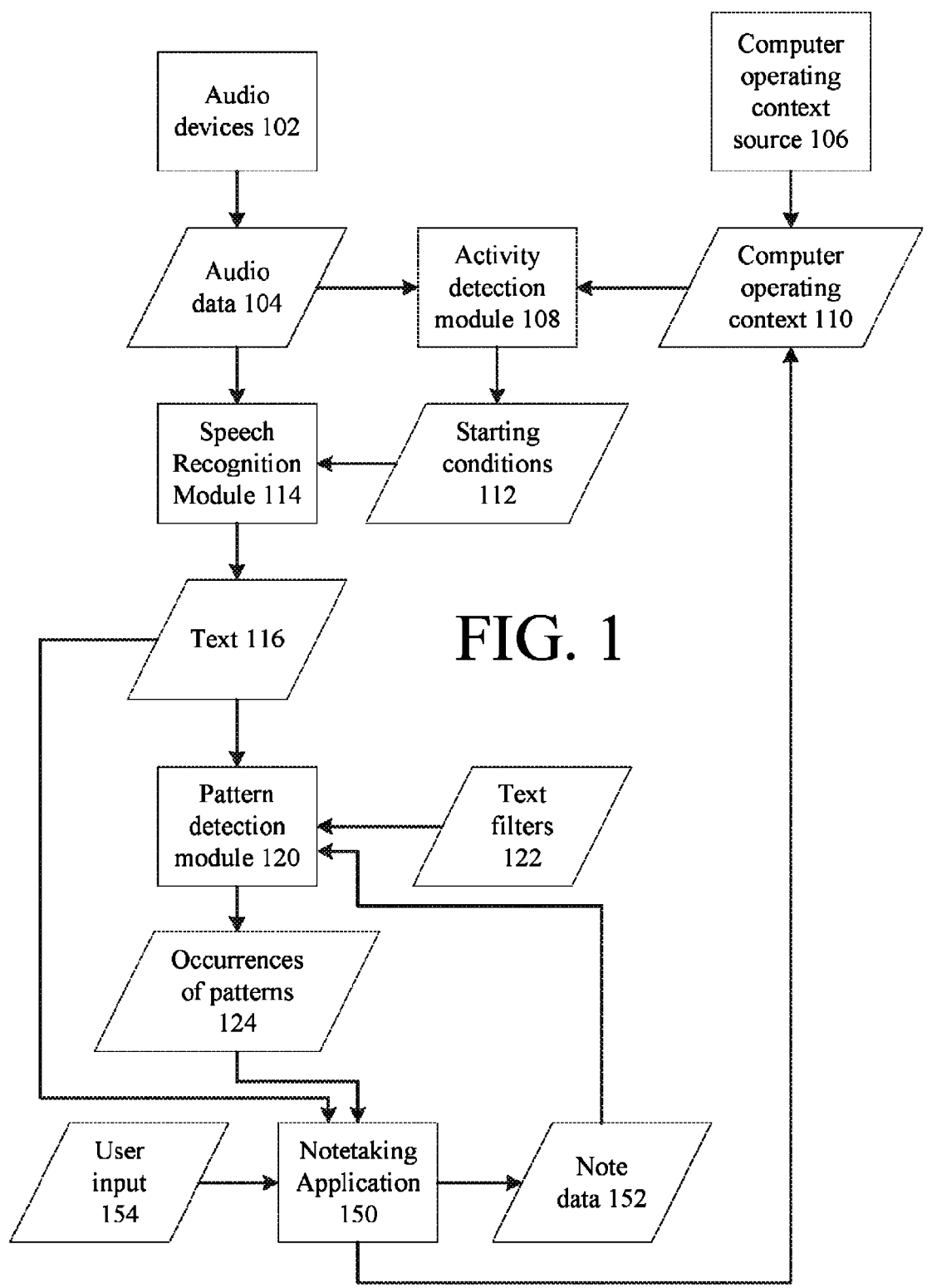
FIG. 1 is a data flow diagram of an example computer system for automatically capturing information from audio data and computer operating context.

FIG. 1 is a data flow diagram of an example computer system for automatically capturing information from audio data and computer operating context.

In general, such a computer system processes audio data and data about computer operating context to automatically capture information, such as information from conversations and meetings. The computer operating context can include, for example, environmental data sensed, or other contextual information maintained or tracked, by the computer. The audio data and computer operating context are processed by the computer to detect starting conditions for data extraction. After detecting a starting condition, the processor initiates speech processing on the audio information to generate corresponding text data. The processor processes the text data using text filters that define salient patterns in the text data. Such salient patterns can correspond to, for example, tasks to be performed, follow-up appointments and other events, messages to be sent, important points or notes, and the like.

The computer system 100 includes a notetaking application 150, which is a computer program executed on a computer, such as described below in connection with FIG. 6. The notetaking application 150 can be any application that allows a user to interactively edit an electronic document that includes at least text, and optionally other related data, by processing user input 155. Such a notetaking application typically allows the user to view and/or store the electronic document. Such user input 155 is received through input devices of the computer. The notetaking application 150 also can access information that is stored in storage of the computer system. The notetaking application 155 also allows the user to read, or hear, or otherwise use the information captured in the notetaking application 150 by presenting such information through output devices of the computer.

A variety of kinds of applications can be used as the notetaking application. For example, the notetaking application can be a word processing application. The notetaking application can be a presentations application. The notetaking application can be an application that is specifically designed to assist note taking. The notetaking application can be a simple text editor.

The notetaking application provides note data 152. The note data 152 can be any form of text, image or other data that is temporarily stored in memory, which the user can direct the notetaking application to store in a data file. The note data 152 can include time stamps, where a time stamp indicates a time at which data was entered into the notetaking application by a user.

The computer system 100 includes one or more audio devices 102 that capture live audio signals and provide audio data 104. The one or more audio devices can be one or more microphones, and/or one or more other devices, such as an audio or audiovisual communication system, which can provide audio data to the computer system.

The computer system 100 also includes one or more sources 106 of computer operating context 110. The computer operating context assists the computer system to identify situations in which capture of notes can be useful. In particular, if the computer system can detect that it is likely being used in a meeting, lecture, conference or other significant conversation, then the computer system can activate automatic information capture.

There are many kinds of sources 106 of computer operating context. One kind of source 106 is a sensor. For example, a location sensor, such as a global positioning sensor, can provide a location of a computer. As another example, a light sensor can provide information about the ambient light in which a computer is being used. As another example sensor is a microphone or other source of audio data. Characteristics of such audio data, such as voice characteristics, can be used.

Another kind of source of computer context information is an application. As an example, a calendar application can provide information about a date, time and/or location of a meeting. As another example, the notetaking application 150 or this computer system 100 can also store history data for a user indicating when and where the user previously used the computer system for automatic information capture, such as in prior meetings. Such history data aggregated over multiple users can be provided. As another example, an audio communication application can provide information indicative of any active phone call supported by that application. As another example, the notetaking application 150 can be a source of computer operating context. If the notetaking application 150 is actively being used by the user, then information capture can be activated.

To identify situations in which automatic information capture can be activated, the computer system 100 has an activity detection module 108 having a first input for receiving the audio data 104 and at least one second input for receiving the computer operating context 110. The activity detection module 108 has an output 112 that is indicative of a starting condition having been detected. The starting condition indicates, to other modules of the computer system, whether those modules can begin processing audio and other data data for an event. The activity detection module processes the received computer operating context 110, such as by applying defined rules or filters, to detect such starting conditions. Operation of an example implementation of the activity detection module, and example rules, will be described in more detail below in connection with FIG. 3.

The computer system 100 has a speech processing module 114 having a first input for receiving the audio data 104, and a second input receiving the output of the activity detection module. In response to the second input indicating that a starting condition has been detected, the speech processing module 114 processes the audio data. The speech processing module 114 has an output 116 that provides a sequence of text data, such as words and phrases. A variety of speech recognition technologies can be used to implement the speech processing module. In one example implementation, the output is time-stamped text data. The output text data can be provided for further processing by being stored in a data file and/or by being stored temporarily in memory.

A pattern detection module 120 has an input that receives the text data output by the speech processing module. The pattern detection module processes the text data using text filters 122 that define salient patterns in text data. The pattern detection module also can be responsive to input from the notetaking application 150. Such salient patterns can correspond to, for example, tasks to be performed, follow-up appointments and other events, messages to be sent, important points or notes, and the like. Salient patterns can be defined, for example, using a syntactical representation such as a rule or other data structure that can be interpreted by the pattern detection module. Examples of such patterns are described in more detail below in connection with FIG. 4. The output of the pattern detection module is a set of occurrences 124 of salient patterns. Each occurrence can include an indication of the type of the pattern detected, and data related to that pattern. Such salient pattern occurrences can include time stamp or other data indicative of when such patterns occur in the audio data or corresponding text data.

Figure 5:
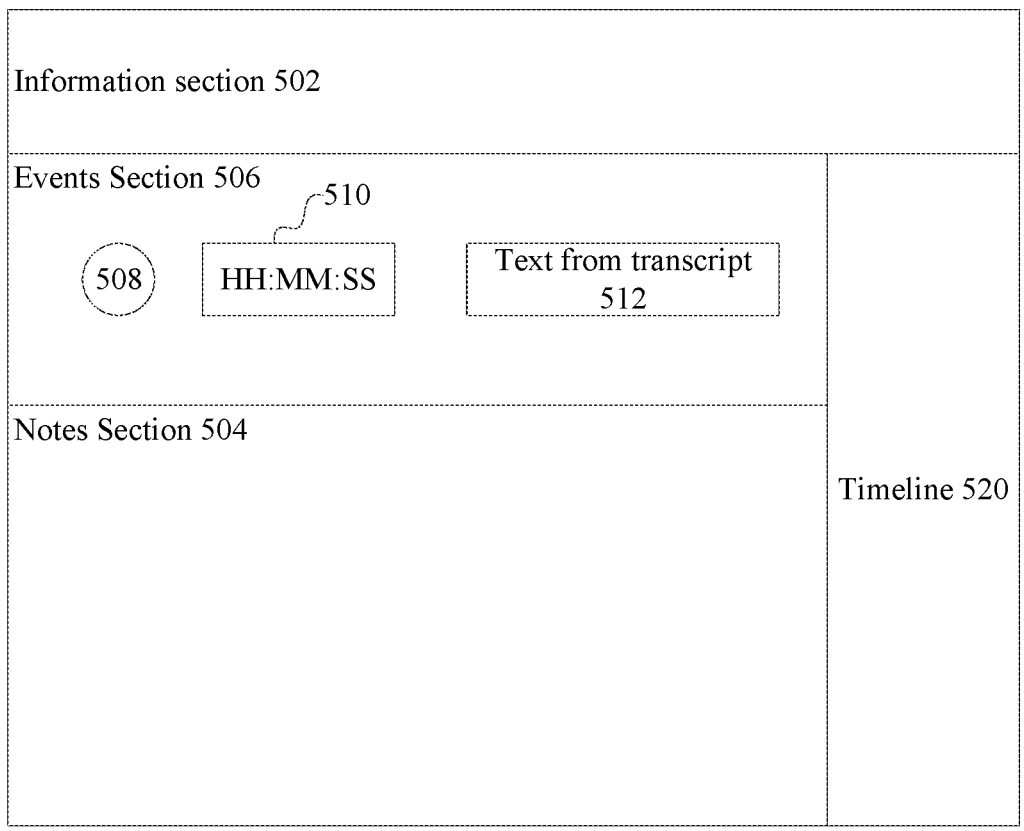
FIG. 5 is an example graphical user interface for a notetaking application.

The notetaking application 150 can be configured to receive the text data from the speech recognition application and/or the set of occurrences of salient patterns from the pattern detection module. Each occurrence is represented by data structured in a data format particular to the type of pattern detected, e.g., a calendar event, a task, a message, a note and the like. The data format can be the data format used by a personal information management tool that handles calendar events, task lists, notes and messages, such as electronic mail, for a user. The notetaking application 150 can include various graphical user interface features, such as shown in FIG. 5 below, that allow a user to view and manipulate the user's own input in combination with the received text and salient patterns. For example, the notetaking application 150 can correlate user input, received text and received salient patterns by their respective time stamps.

The computer system 100 in FIG. 1 can be implemented using one or more computers, such as described below in FIG. 6. There are a variety of deployments where a first computer, such as a computer used by an individual participating in a meeting, includes at least the notetaking application 150. Other parts of the computer system can reside on one or more other computers, such as server computers with which the user's computer communicates over a computer network to which the server computers and the user's computer are connected.

In one example deployment, the activity detection module and notetaking application reside on a first computer. When the activity detection module detects a starting condition, it begins transferring audio data to at least one second computer. The second computer includes the speech processing module and pattern detection module and returns results to the first computer. The sources of computer operating context can reside solely on the first computer, or can also include data received from one or more other computers.

In another example deployment, all of the elements of FIG. 1 reside on a single computer.

In another example deployment, only the notetaking application 150 resides on the first computer. The remaining components of the computer system reside on one or more second computers, such as server computers with which the user's computer communicates over a computer network to which the server computers and the user's computer are connected.

Figure 2:
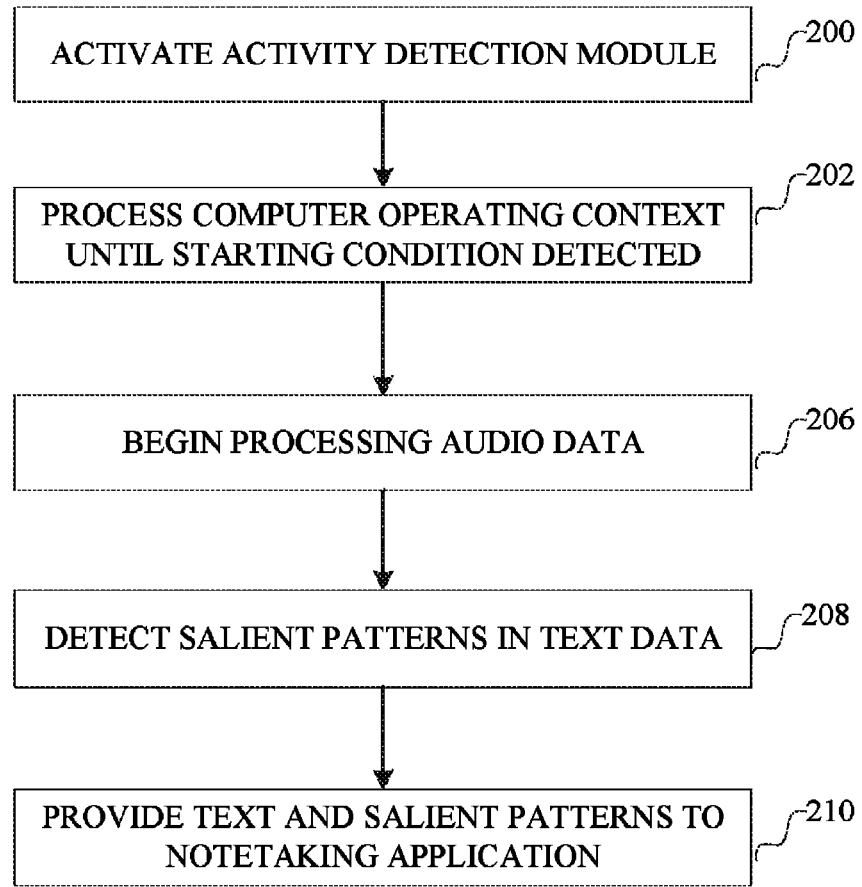
FIG. 2 a flow chart describing operation of an example implementation of a computer system.

Referring now to FIG. 2, a flowchart, describing overall system operation in one implementation of the computer system, will now be described.

The activity detection module is first activated 200. The activity detection module can be a computer program that generally runs, for example in a background mode, and responds to computer operating context information as such information becomes available and/or changes. The activity detection module processes 202 the computer operating context information until a starting condition is detected.

After the starting condition is detected, the speech recognition module begins 206 processing audio data, and outputs text data. After the speech recognition generates text data, the pattern detection module can detect 208 salient patterns in that text data. Text data and/or salient patterns can then be provided 210 to the notetaking application. In some implementations, such processing can occur in real time while a conversation is occurring; in other implementations, there can be a delay between the system receiving audio data and the text and salient pattern output resulting from processing that audio data.

Activity Detection Module

Turning now to FIG. 3, an example implementation of the activity detection module will now be described. In this example implementation, the activity detection module has a set of data 300 that it maintains based on the information it receives from the sources of computer operating context. The data structure shown in FIG. 3 is merely an example. In any implementation, more or less data, or different data, can be stored, and data can be stored in multiple data structures. Generally speaking, data 300 can be implemented a collection of name-value pairs. The activity detection module can update the data structure as data is received from its sources, or by periodically retrieving and processing data, depending on the data source.

In FIG. 3, such computer operating context data can include, for example, a data extraction enabled flag 301 can indicate whether a starting condition has already been detected and data extraction is currently in process. This flag can be set when the starting condition is detected, for example by the activity detector. A notetaking application in use flag 302 can indicate whether the notetaking application is currently in use. In one implementation, when the notetaking application is first started, the notetaking application can set this flag. Other applications can detect the presence of an active process for the notetaking application.

The location 304 of the user can be stored, such as in GPS coordinates or other information such as the name of a meeting room. The ambient light level 306 of a room can be stored. Voice level data 308 extracted from an audio signal can be stored, such as the number of people detected, and amount of time speaking by each person, and the like. A history of user locations 310 can be a set of one or more locations, such as in GPS coordinates, meeting room names, and the like. A next appointment date/time 312, and next appointment location 314 are examples of appointment data that can be stored.

An active phone call flag 316 can indicate whether another application or device for the user is engaged in an active phone call. Other information for a user that can be stored can be information about the business, such as typical working hours and identifiers of coworkers.

It also can be assumed that the activity detection module has access to the current date and time, but such data is likely provided by an operating system of a computer running the module, and would not be stored as part of the context data.

The data shown in FIG. 3 can be stored in a single data structure, or can be stored in multiple data structures. The data structures can reside in different types of memory, such as processor registers, input/output registers, main memory, files and the like.

Given the data maintained by the activity detection module, it can process such data, typically when a change to such data occurs, to detect whether a starting condition has occurred. Starting conditions can be detected by applying rules to the stored data. An example rule set 350 is shown in FIG. 3. It should be understood that FIG. 3 is merely an example and not limiting, as any variety of rules can be defined, depending on the nature of the data maintained by the activity detection module and the conditions under which a system designer intends the system to operate.

In general, in the rule set 350 a rule 352 has a set of conditions 354. Each condition 356 includes one or more values 358 and one or more operations 360. An operation 360 can be defined, for example, by one or more operators and one or more other values. The simplest rules specify a variable (e.g., notetaking application in use), and operator (e.g., equals), and another value (e.g., true). If all of the conditions are met, then the rule "fires" or indicates that a starting condition has been detected. The activity detection module can process rules in many ways, such as by periodically testing all rules, or by testing rules when data changes.

As shown in FIG. 3, an example rule 352 can have the following conditions: if the notetaking application is in use, and the ambient light is less than a threshold, and the user is in a location that is in the history of locations. As another example, a rule can have the following conditions: the date/time of the next meeting on the user's calendar includes the current time.

Activity detection can be based on other ways of processing the computer operating context data. For example, a scoring algorithm can be applied to generate a score based on the available data. If the score is over a threshold, then a starting condition can be detected. Such scoring can be defined within a computer program and can give more weight to some context data than others. For example, low ambient light in a room can increase the score. Whether the current time is within current work hours can increase the score.

Other examples of indications that a starting condition can be detected include, but are not limited to: the user is in a location in which many people have captured notes in the past; the active phone call is on the user's machine, especially during the user's normal work hours; the persistent presence of one or more distinct voices detected simultaneously with an open notes page or document, as might happen in an ad-hoc document discussion or review; the persistent presence of a single distinct voice, as might occur in a lecture; any such conditions especially if the ambient light level is dim, as might happen during a presentation.

Pattern Detection Module

Referring now to FIG. 4, an example implementation of a pattern detection module will now be described in more detail. A pattern detection module receives the text data output from the speech recognition module and identifies salient patterns. Such salient patterns can correspond to, for example, tasks to be performed, follow-up appointments and other events, messages to be sent, important points or notes, and the like. The pattern detection module has pattern data 400 that describes a salient pattern. The pattern data specifies a pattern of one or more textual elements 402 that can occur in text and an action 404 corresponding to that pattern of textual elements.

The specified pattern can be defined, for example, using regular expressions, rules, filters or using other programming logic. The textual elements can be actual words, or types of words or word categories. For example, the word "Monday" is a kind of "day". For example, an expression "[day] near [time]" can be used to detect a possible appointment. Such an expression would be triggered by the occurrence in the text of a phrase such as "Let's meet again next Wednesday at 10AM". Expressions also can be written to detect specific phrases such as: "This is key," "Important," "Homework," "For next time," "Follow-up," "Action item," "Will you please", etc.

The action can be any data that indicates what is significant about the detected pattern, and can be used by the pattern detection module to determine what to do with the detected pattern. For example, a pattern might indicate the possibility of: an appointment to be scheduled, an event, or other item that can be on a calendar; a task to be performed or other item that can be on a "to do" list; an electronic mail to be sent or other item that can be a message to be sent; a note to be stored or other item of information, such as a document, that is important and can be stored.

In one implementation, the output of the pattern recognition module, given text that matches a pattern, can be generated based on the text that matches the pattern and its timestamp, and a template corresponding to the type of action to which the pattern is related. The template can be a kind of data structure used by other computer programs to represent an item that corresponds to the kind of action. For example, data structures for a mail message, calendar item, task or to do list item, text document and the like, such as commonly used in personal information management applications, can be used as templates. Such a template can be populated with information based on the text that matches the pattern. For example, a calendar item can be generated with a date and time completed from the extracted data. The pattern recognition module can output a data structure including this populated template and a time stamp to the notetaking application.

Notetaking Application Graphical User Interface

Referring now to FIG. 5, an example of one aspect of a graphical user interface for a notetaking application will now be described.

The notetaking application can receive data including at least user input, text from the speech recognition module and information from the pattern recognition module. Each of these inputs can be time stamped. There are a variety of ways in which such information can be conveyed to a user. In one implementation of the graphical user interface, such elements can be displayed in different sections of a display, such as a user notes section, a transcript section and an events section. In one implementation of the graphical user interface, such elements can be displayed on a time line based on time stamp. A search interface also can be provided to receive user input for searching the content.

In an implementation illustrated in FIG. 5, a graphical user interface of the notetaking application includes a display area 500. The display area 500 includes a meeting information section 502 which provides information about a meeting. This information can be obtained, for example, from a calendar entry stored for the meeting. A notes section 504 is an area which a user can select and in which the user can input data when selected. An events section 506 allows information from the pattern detection module to be displayed. Such events can be displayed in a number of ways. In this implementation, an icon 508 indicates a type of event, a time 510 indicates a time in the transcript with which the event is associated, and content 512 includes information such as text extracted from the transcript or other information related to the event. The type of event can be, for example, a task, a calendar event, a message, a note or the like. The user can manipulate an event, through user inputs through one or more input devices, such as by manipulating the displayed icon, in response to which the notetaking application can display more information about the event. For example, for a calendar event, the user can be prompted to complete a meeting invitation, which can then be transmitted to the participants through a calendar application.

A timeline pane 520 displays a representation of a timeline for a meeting. The user can manipulate the timeline, through user inputs through one or more input devices, such as by selecting a point in the timeline. In response the notetaking application can display the transcript, and other information associated with the meeting, such as the user notes and the detected events, in another view (not shown), based on the time stamps for such data.

Such a graphical user interface allows users to take notes and see events and efficiently process meeting related data, thus improving their productivity. Storage of such information from the notetaking applications of multiple participants in a meeting can improve workgroup productivity as well.

It should be understood that the foregoing description is merely an example of implementations of a computer system that processes audio data and computer operating context to capture information from conversations and meetings. A variety of implementations are possible.

By having a computer system that provides an automated tool to process audio data and computer operating context to automatically capture information from conversations and meetings, user productivity is improved. In particular, the automatic identification of tasks to be performed, follow-up appointments and other events, messages to be sent, important points or notes, and the like improves productivity of work groups.

Accordingly, in one aspect a computer system comprises at least one audio input device, at least one computer storage medium and at least one processor, wherein the at least one audio input device and the computer storage medium are configured to receive and store live audio data for processing by the computer system. The computer system is further configured by one or more computer programs to access data in the computer storage medium defining computer operating context of the computer system; detect starting conditions by processing the computer operating context from the computer storage medium; after detecting starting conditions, process the live audio data to extract at least text and store the text in the at least one computer storage medium; process the extracted text to generate information in the at least one computer storage medium identifying salient patterns in the extracted text; and provide the extracted text and the information identifying salient patterns to a notetaking application running on the computer system, wherein the notetaking application is configured to receive user input to edit an electronic document in the at least one computer storage medium incorporating at least a portion of the extracted text and the information identifying salient patterns.

In another aspect, an article of manufacture comprises at least one computer storage medium comprising at least one of a memory device and a storage device, and computer program instructions stored on the at least one computer storage medium which, when processed by a computer system, configures the computer system. The computer system is configured to access data in the computer storage medium defining computer operating context of the computer system; detect starting conditions by processing the computer operating context from the computer storage medium; after detecting starting conditions, process the live audio data to extract at least text and store the text in the at least one computer storage medium; process the extracted text to generate information in the at least one computer storage medium identifying salient patterns in the extracted text; provide the extracted text and the information identifying salient patterns to a notetaking application running on the computer system, wherein the notetaking application is configured to receive user input to edit an electronic document in the at least one computer storage medium incorporating at least a portion of the extracted text and the information identifying salient patterns.

In another aspect, a process is performed by a computer system that includes at least one audio input device, at least one computer storage medium, and at least one processor. The at least one audio input device and the at least one computer storage medium are configured to receive and store live audio data in the at least one computer storage medium for processing. The process comprises accessing data in the computer storage medium defining computer operating context of the computer system; detecting starting conditions by processing the computer operating context from the computer storage medium; after detecting starting conditions, processing the live audio data to extract at least text and store the text in the at least one computer storage medium; processing the extracted text to generate information in the at least one computer storage medium identifying salient patterns in the extracted text; providing the extracted text and the information identifying salient patterns to a notetaking application running on the computer system, wherein the notetaking application is configured to receive user input to edit an electronic document in the at least one computer storage medium incorporating at least a portion of the extracted text and the information identifying salient patterns.

In another aspect a computer system includes means for storing live audio data from an audio input device and means for storing data defining computer operating context of the computer system. The computer system further includes means for detecting starting conditions from the computer operating context. A means for processing the live audio data is operative, in response to a detection of a starting condition by the means for detecting, to extract text from the live audio data. A means for processing the extracted text provides information identifying salient patterns in the extracted text. An output means provides the extracted text and the information identifying salient events to a notetaking application configured to receive user input to edit an electronic document incorporating at least a portion of the extracted text and the information identifying salient patterns.

In another aspect a computer system includes a computer program defining a notetaking application, the notetaking application configuring the computer system to at least receive user input, to receive extracted text from a speech recognition process applied to live audio data, and to receive information identifying salient events in the extracted text. The notetaking application further configures the computer system to allow a user to interactively edit an electronic document incorporating at least a portion of the extracted text and the information identifying salient patterns. The computer system is further configured to provide computer operating context which controls starting of the speech recognition process.

In any of the foregoing aspects, the data defining computer operating context can include environmental data from a sensor, such as ambient light, and/or data indicating a location of a computer, such as a computer running the notetaking application, and/or other sensor data.

In any of the foregoing aspects, the data defining computer operating context can include meeting data, such as including locations of meetings.

In any of the foregoing aspects, the notetaking application can have a graphical user interface for presenting the extracted text, salient patterns and user input.

In any of the foregoing aspects, to automatically process the extracted text to identify salient patterns, the computer system is further configured to apply one or more filters to the extracted text, each of the one or more filters defining a pattern of text corresponding to an action. The action can be any one or more of, at least, a calendar event, a task, a note and a message.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Figure 6:
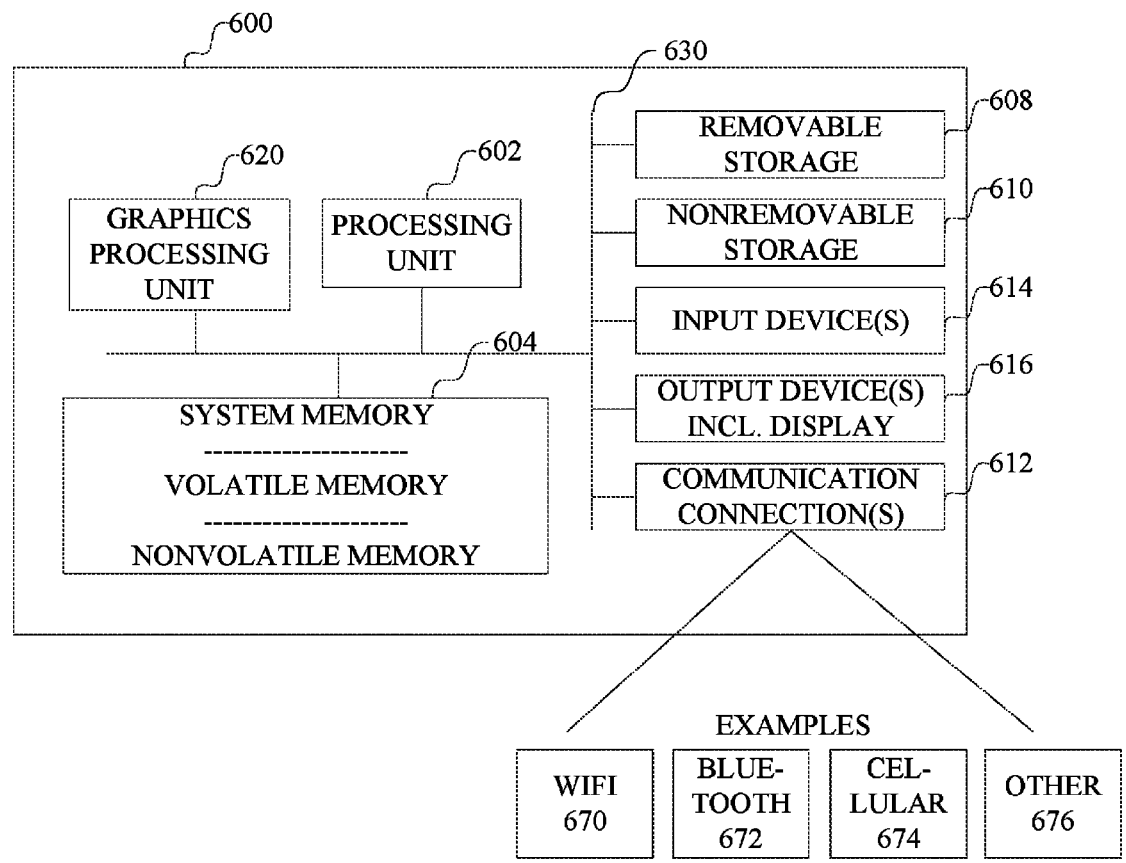
FIG. 6 is a block diagram of an example computer in which components of such a system can be implemented.

Referring to FIG. 6, an example implementation of a general purpose computer will now be described. A general purpose computer is computer hardware that is configured with computer programs providing instructions to be executed by one or more processors or other logic devices in the computer. Computer programs on a general purpose computer generally include an operating system and applications. The operating system is a computer program running on the computer that manages access to various resources of the computer by the applications and the operating system. The various resources generally include the one or more processors or logic devices, memory, storage, communication interfaces, input devices and output devices.

Examples of general purpose computers include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

FIG. 6 illustrates an example of computer hardware for a computer. An example computer 600 includes at least one processing unit 602 and memory 604. The computer can have multiple processing units 602 and multiple devices implementing the memory 604. A processing unit 602 can include one or more processing cores (not shown) that operate independently of each other. Additional co-processing units, such as graphics processing unit 620 or other logic devices, also can be present in the computer; such logic devices may be located within some of the other components of the computer and shown in FIG. 6.

The memory 604 may include volatile devices (such as dynamic random access memory (DRAM) or other random access memory device), and non-volatile devices (such as a read-only memory, flash memory, and the like) or some combination of the two. The computer 600 can include additional storage (removable and/or non-removable) including, but not limited to, magnetically-recorded or optically-recorded disks or tape. Such additional storage is illustrated in FIG. 6 by removable storage 608 and non-removable storage 610. The various components in FIG. 6 are generally interconnected by an interconnection mechanism, such as one or more buses 630.

A computer storage medium is any medium in which data can be stored in and retrieved from addressable physical storage locations by the computer. Computer storage media includes volatile and nonvolatile memory devices, and removable and non-removable storage media. Memory 604 and 606, removable storage 608 and non-removable storage 610 are all examples of computer storage media. Some examples of computer storage media are RAM, ROM, EEPROM, flash memory, processor registers, or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 600 may also include communications connection(s) 612 that allow the computer to communicate with other devices over a communication medium. Communication media transmit data, such as computer program instructions, data structures, program modules or other data, over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 612 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

In a computer, example communications connections include, but are not limited to, a wireless communication interface for wireless connection to a computer network, and one or more radio transmitters for telephonic communications over cellular telephone networks, and/or. For example, a WiFi connection 672, a Bluetooth connection 674, a cellular connection 670, and other connections 676 may be present in the computer. Such connections support communication with other devices. One or more processes may be running on the computer and managed by the operating system to enable voice or data communications over such connections.

The computer 600 may have various input device(s) 614 such as a touch-based input devices, pen, camera, microphone, sensors, such as accelerometers, gyroscopes, thermometers, light sensors, and the like, and so on. Output device(s) 616 such as a display, speakers, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 610, communication connections 612, output devices 616 and input devices 614 can be integrated within a housing with the rest of the computer hardware, or can be connected through various input/output interface devices on the computer, in which case the reference numbers 610, 612, 614 and 616 can indicate either the interface for connection to a device or the device itself as the case may be.

Each component (which also may be called a "module" or "engine" or the like), of a computer system such as described herein, and which operates on the computer, can be implemented using the one or more processing units or logic devices of the computer and one or more computer programs processed by the computer. Generally speaking, such modules have inputs and outputs through locations in memory or processor registers from which data can be read and to which data can be written when the module is executed by the computer. A computer program includes computer-executable instructions and/or computer-interpreted instructions, such as program modules, which instructions are processed by the computer. Generally, such instructions define routines, programs, objects, components, data structures, and so on, that, when processed by the computer, instruct the computer to perform operations on data or configure the computer to implement various components or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A computer system, comprising:
    at least one audio input device, at least one computer storage medium and at least one processor, wherein the at least one audio input device and the computer storage medium are configured to receive and store live audio data for processing by the computer system;
    wherein the computer system is further configured by a computer program in the computer storage medium to:
    determine, using the processor, when to begin processing the live audio data and other data derived from the processed live audio data;
    after determining to begin processing;
        process, using the processor, the live audio data to extract at least text and store the text in the at least one computer storage medium;

process, using the processor, the extracted text to generate information in the at least one computer storage medium identifying salient patterns in the extracted text; and provide the extracted text and the information identifying salient patterns in the computer storage medium for access by to a notetaking application running on the computer system, wherein the notetaking application running on the computer system is configured to receive user input to edit an electronic document in the at least one computer storage medium incorporating the extracted text and the information identifying salient patterns.

2. The computer system of claim 1, wherein to determine to begin processing, the computer system is further configured to detect a starting condition based on data defining computer operating context.

3. The computer system of claim 2, wherein the data defining computer operating context includes data indicating ambient light.

4. The computer system of claim 2, wherein the data defining computer operating context includes data indicating a location of a computer.

5. The computer system of claim 2, wherein the data defining computer operating context includes meeting data including locations of meetings.

6. The computer system of claim 1, wherein the notetaking application has a graphical user interface for presenting the extracted text, salient patterns and user input.

7. The computer system of claim 1, wherein to automatically process the extracted text to identify salient patterns, the computer system is further configured to apply one or more filters to the extracted text, each of the one or more filters defining a pattern of text corresponding to an action.

8. An article of manufacture comprising:
at least one computer storage medium comprising at least a memory device or a storage device,
computer program instructions stored on the at least one computer storage medium which, when processed by a computer system, the computer system including at least one audio input device, the at least one computer storage medium, and at least one processor, wherein the at least one audio input device and the at least one computer storage medium are configured to receive and store live audio data in the at least one computer storage medium for processing, configures the computer system to:
determine when to begin processing the live audio data and other data derived from the processed live audio data;
after determining to begin processing the live audio data, process, using the processor, the live audio data to extract at least text and store the text in the at least one computer storage medium;
process, using the processor, the extracted text to generate information in the at least one computer storage medium identifying salient patterns in the extracted text;
provide the extracted text and the information identifying salient patterns in the computer storage medium for access by a notetaking application running on the computer system, wherein the notetaking application running on the computer system is configured to receive user input to edit an electronic document in the at least one computer storage medium incorporating the extracted text and the information identifying salient patterns.

9. The article of manufacture of claim 8, wherein to determine to begin processing, the computer system is further configured to detect a starting condition based on data defining computer operating context.

10. The article of manufacture of claim 9, wherein the data defining computer operating context includes data indicating ambient light.

11. The article of manufacture of claim 9, wherein the data defining computer operating context includes data indicating a location of a computer.

12. The article of manufacture of claim 9, wherein the data defining computer operating context includes meeting data including locations of meetings.

13. The article of manufacture of claim 8, wherein the application includes a graphical user interface for presenting the extracted text, salient patterns and user input.

14. The article of manufacture of claim 8, wherein to automatically process the extracted text to identify salient patterns, the computer system is configured to apply one or more filters to the extracted text, each of the one or more filters defining a pattern of text corresponding to an action.

15. A process performed by a computer system including at least one audio input device, at least one computer storage medium, and at least one processor, wherein the at least one audio input device and the at least one computer storage medium are configured to receive and store live audio data in the at least one computer storage medium for processing, the process comprising:
determine when to begin processing the live audio data and other data derived from the processed live audio data;
after determining to begin processing, processing the live audio data to extract at least text and store the text in the at least one computer storage medium;
processing the extracted text to generate information in the at least one computer storage medium identifying salient patterns in the extracted text;
providing the extracted text and the information identifying salient patterns to a notetaking application running on the computer system, wherein the notetaking application is configured to receive user input to edit an electronic document in the at least one computer storage medium incorporating at least a portion of the extracted text and the information identifying salient patterns.

16. The process of claim 15, wherein determining to begin processing comprises detect a starting condition based on data defining computer operating context.

17. The process of claim 16, wherein the environmental data includes at least ambient light.

18. The process of claim 16, wherein the environmental data includes data indicating a location of a computer.

19. The process of claim 16, wherein the data defining computer operating context includes meeting data including locations of meetings.

20. The process of claim 15, wherein to automatically process the extracted text to identify salient patterns, the computer system is configured to apply one or more filters to the extracted text, each of the one or more filters defining a pattern of text corresponding to an action.

* * * * *